(12) United States Patent
Matsuishi et al.

(10) Patent No.: US 7,226,889 B2
(45) Date of Patent: Jun. 5, 2007

(54) OPTICAL INFORMATION-RECORDING MEDIUM

(75) Inventors: Fujio Matsuishi, Tokyo (JP); Kanji Shimizu, Yokohama (JP); Morito Morishima, Fukuroi (JP)

(73) Assignees: Yamaha Corporation, Hamamatsu-shi (JP); Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 10/752,914

(22) Filed: Jan. 7, 2004

(65) Prior Publication Data

US 2004/0219327 A1 Nov. 4, 2004

(30) Foreign Application Priority Data

Jan. 8, 2003 (JP) .................. P.2003-001793

(51) Int. Cl.
*B41M 5/20* (2006.01)
(52) U.S. Cl. ............... 503/200; 428/64.4; 428/195.1
(58) Field of Classification Search ............ 428/64.1, 428/64.4, 913; 430/270.11, 495.1, 945
See application file for complete search history.

(56) References Cited

U.S. PATENT DOCUMENTS

| | | | |
|---|---|---|---|
| 5,317,337 A | | 5/1994 | Ewaldt |
| 5,989,669 A | | 11/1999 | Usami |
| 6,077,582 A | * | 6/2000 | Yoshimura et al. ......... 428/64.1 |
| 6,238,764 B1 | | 5/2001 | Usami |
| 6,461,711 B1 | * | 10/2002 | Ishida et al. ............... 428/64.1 |
| 2001/0026531 A1 | * | 10/2001 | Onodera et al. ............ 369/284 |
| 2002/0191517 A1 | * | 12/2002 | Honda et al. ............ 369/53.29 |
| 2003/0108708 A1 | * | 6/2003 | Anderson et al. .......... 428/64.4 |
| 2003/0179679 A1 | | 9/2003 | Morishima |
| 2004/0147399 A1 | * | 7/2004 | Gore .......................... 503/221 |

FOREIGN PATENT DOCUMENTS

| | | |
|---|---|---|
| JP | 64-38237 | 2/1989 |
| JP | 04-085780 | 3/1992 |
| JP | 09-306144 | 11/1997 |
| JP | 10-106037 | 4/1998 |
| JP | 10-162437 | 6/1998 |
| JP | 11-283356 | 10/1999 |
| JP | 2000-149334 | 5/2000 |
| JP | 2000-173096 | 6/2000 |
| JP | 2001-283464 | 10/2001 |
| JP | 2002-074757 | 3/2002 |
| JP | 2002-203321 | 7/2002 |
| JP | 2002-216396 | 8/2002 |
| JP | 2002-251862 | 9/2002 |
| JP | 2002-367337 | 12/2002 |
| JP | 2001-213477 | 1/2003 |
| JP | 2003-016650 | 1/2003 |
| JP | 2003-272240 | 9/2003 |

* cited by examiner

*Primary Examiner*—Bruce H. Hess
(74) *Attorney, Agent, or Firm*—Pillsbury Winthrop Shaw Pittman LLP

(57) ABSTRACT

An optical information-recording medium includes: a substrate; an electronic information-recording layer on the substrate in which digital information is recorded by the light applied from the side of the substrate; a reflection layer on the electronic information-recording layer; a visible information-recording layer on the reflection layer so that a region of the visible information-recording layer lays outside a circumference having a radius not less than half a radius of the substrate; and an over-coating on the visible information-recording layer. Visible information is recorded in the visible information-recording layer with light applied through the over-coating.

11 Claims, 2 Drawing Sheets

OPTICAL INFORMATION-RECORDING MEDIUM

BACKGROUND OF THE INVENTION

The present invention relates to an optical information-recording medium capable of optical recording/reproduction of information and more specifically relates to an optical information-recording medium capable of optical recording/reproduction of electronic information and satisfactorily recording visible information on the label surface with use of a laser beam.

The significance of electronic information-recording media used for recording, storage and rewriting of a lot of information as computer peripherals is ever increasing in recent years. Of various types of such media, optical information recording media with which recording and reproduction are performed with use of a laser beam are attracting attention as large volume recording media due to their capability of high-density information recording, storage and reproduction. Examples of such optical information-recording media include those of phase-changing type represented by CD-RW and DVD-RW, and those based on organic dyes represented by CD-R and DVD-R.

The content of the electronic information recorded in such an optical information-recording medium can be confirmed via optical reproduction. On the other hand, it is also important, from the viewpoint of information management, to display the content of the electronic information on the surface of the medium as visible information. As such display methods, there have been conventionally adopted, for example, the method of printing and recording the electronic information content on the label surface of the medium (the surface opposite to the surface for recording electronic of information) with use of an inkjet printer or thermal printer, the method of attaching a label printed with the electronic information content. Of these and others, a method of recording visible information in the label surface of the medium with use of a laser beam (Patent Document 1), and a method of further attaching a sheet, on which letters are printed, on the recording layer for visible information (Patent Document 2) have been reported recently. Such methods are considered promising because they can record visible information without exerting any mechanical influence on the medium.

FIG. 2 is a diagram to describe the configuration of a conventional optical information-recording medium in which visible information is recorded on the label surface side with use of a conventional laser beam as described, for example, in Patent Documents 1 and 2. The optical information-recording medium 200 illustrated here has a configuration consisting of a substrate 201 made of a polycarbonate-based resin and provided with guiding grooves or pits for recording and reproduction, an electronic information-recording layer 202 in which electronic information is recorded with a laser beam 207 applied from the side of substrate 201, a reflection layer 203 made of a metal such as Ag or Au, a protective layer 204 made of a UV-curable resin, a visible information-recording layer 205 in which visible information is recorded with a laser beam 208 applied from the side of the label surface, and an over-coating layer 206 that constitutes the outermost layer, all these layers being provided on this substrate 201 and stacked sequentially in the described order.

As shown in FIG. 2, visible information is recorded in visible information-recording layer 205, for example, by the coloration of a chromogenic organic dye constituting visible information-recording layer 205 upon absorption of a laser beam 208 irradiated from the side of the label surface.

Patent Document 1
  JP-A-2000-173096

Patent Document 2
  JP-A-2001-283464

Meanwhile, the method of recording visible information on the label surface of a medium with use of a laser beam utilizes changes such as reaction, fusing or deposition caused by heat. Accordingly, sufficient care must be taken for the laser irradiation method because excessive irradiation has a thermal influence on the electronic information having been recorded in the medium. To suppress such thermal influence on the medium, it is necessary to use a low power laser beam. When a low power laser beam is used, laser beam 208 is focused on visible information-recording layer 205 to effectively condense the energy of laser beam 208. Thus, recording with use of low power laser beam 208 becomes possible. To achieve such condensing, in the case where laser beam 208 emitted from the writer for electronic information recording is used, focus servo of laser beam 208 applied from the label surface side is carried out with use of reflected light 209, which is reflected from reflection layer 203 provided on electronic information-recording layer 202.

On the other hand, on visible information-recording layer 205, over-coating 206 constituting the outermost layer is provided. In order to efficiently apply laser beam 208 from the label surface side to visible information-recording layer 205 and to execute a stable focusing, a relatively thick over-coating 206 is preferred; specifically, the thickness of the over-coating preferably lies roughly in the range of 10 to 80 µm. Such over-coating 206 is fabricated, for example, with a UV-curable resin and the like via spin coating or screen printing.

When over coating 206 is formed by coating a UV-curable resin so as to cover the entire area of the label surface of optical information-recording medium 200 in such a manner, it is generally well known that the disk tends to bend by the stretching or compressive stress caused by the curing shrinkage of the UV-curable resin. For example, even a UV-curable resin with a low shrinking ratio and in general use shows shrinkage of 5 to 10%. When over-coating 206 with about 50 µm thickness is formed by using such a UV-curable resin, there occurs a risk of marked deflection of the disk. A method of compensating the resulting deflection by bending the disk in the reverse direction beforehand may be adopted, but such a method requires a precise control for the process of disk manufacture, accompanying disadvantages such as productivity deterioration.

SUMMARY OF THE INVENTION

The invention has been devised in order to solve the technical tasks which have become clear in the recording, with use of a low power laser beam, of visible information in a visible information-recording layer provided on the side of the label surface of an optical information-recording medium.

Accordingly, the object of the invention is to provide an optical information-recording medium which exhibits a reduced deflection of the disk, and is capable of recording visible information on the label surface side by the irradiation of a low power laser beam with use of a laser unit for electronic information recording/reproduction without accompanying any adverse effect on the electronic information having been recorded in the medium.

In order to solve the aforesaid object, the invention is characterized by having the following arrangement.

(1) An optical information-recording medium comprising:

a substrate; and a visible information-recording layer formed on the substrate so that a region of the visible information-recording layer lays outside a circumference having a radius not less than half a radius of the substrate, wherein visible information is recorded in the visible information-recording layer with light applied from a label surface arranged opposite to a side of the substrate.

(2) The optical information-recording medium according to (1), wherein the visible information-recording layer is formed in the shape of circular ring on a side of the label surface.

(3) The optical information-recording medium according to (1), wherein the visible information-recording layer is formed of a material which changes chromogenic property or transparency by the light applied to the visible information-recording layer.

(4) The optical information-recording medium according to (1), wherein the visible information-recording layer has an area not exceeding three fourth of that of the label surface.

(5) An optical information-recording medium comprising:

a substrate;

an electronic information-recording layer on the substrate in which digital information is recorded by the light applied from the side of the substrate;

a reflection layer on the electronic information-recording layer;

a visible information-recording layer on the reflection layer so that a region of the visible information-recording layer lays outside a circumference having a radius not less than half a radius of the substrate; and an over-coating on the visible information-recording layer, wherein visible information is recorded in the visible information-recording layer with light applied through the over-coating.

(6) The optical information-recording medium according to (5) further comprising a protective layer between reflection layer and the visible information-recording layer.

(7) The optical information-recording medium according to (6), wherein the substrate, electric information-recording layer, the reflection layer and the protective layer have the substantially same radius.

By way of confirmation, in the optical information-recording medium to which the invention is applied, the term "visible information" indicates information that can be read visually, including letters and signs, images such as illustrations or photographs, and geometric patterns, while the term "electronic information" means information whose content is read with a certain reproducing apparatus, including those recorded in digital form.

Incidentally, according to the invention, an arbitrary layer may be formed between the adjacent two layers. For example, dielectric layers may be formed on the electronic information-recording layer, a second reflection layer may be inserted between protective layer and visible information-recording layer, and a laser-transmitting layer may be formed between the second reflection layer and visible information-recording layer.

DETAILED DESCRIPTION OF PREFERRED EMBODIMENTS

In the following, an optical information-recording medium according to an embodiment of the invention will be described in detail with reference to the accompanying drawings.

Figure 1:
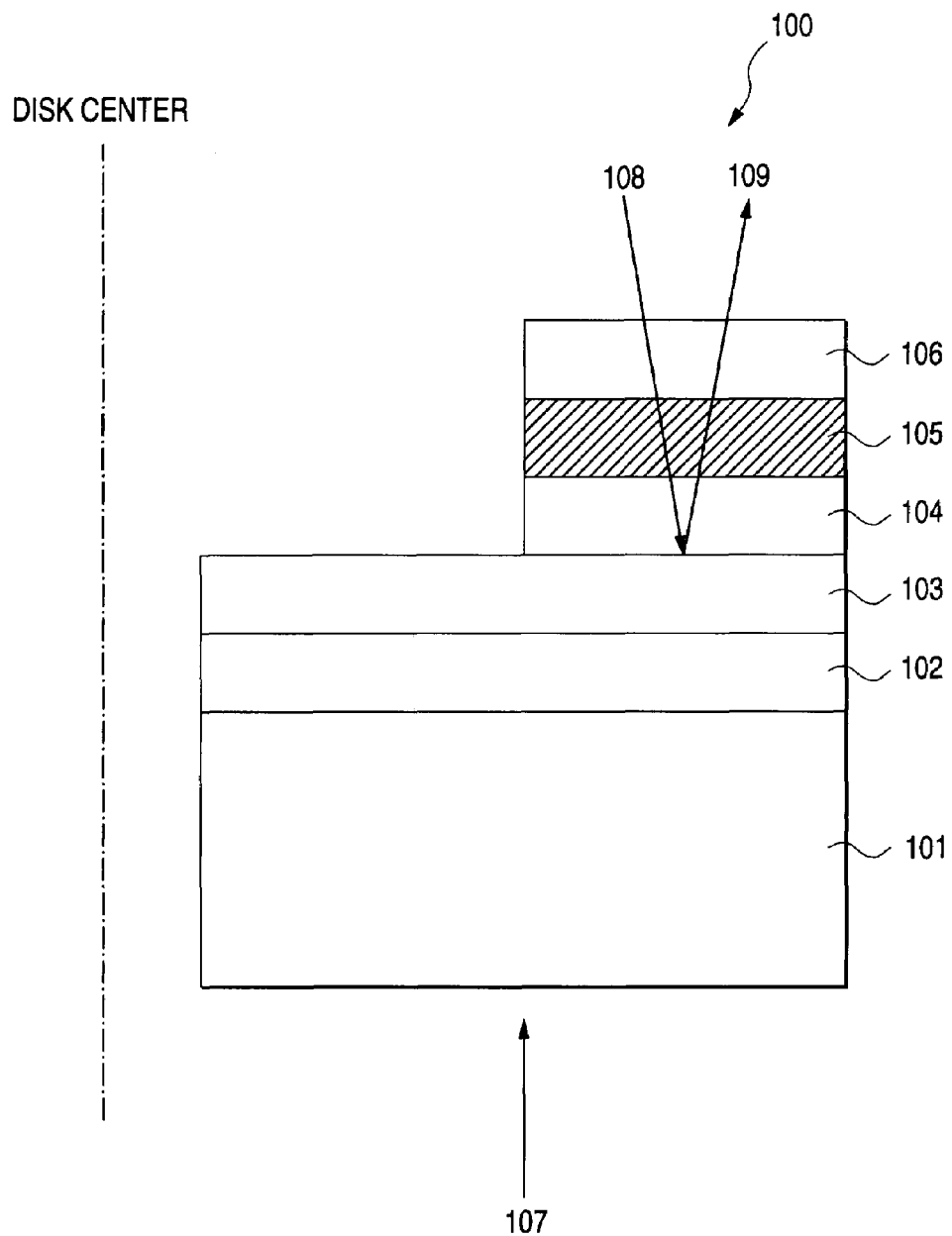
FIG. 1 is a diagram to explain the configuration of an optical information-recording medium to which the present embodiment is applied.
Figure 2:
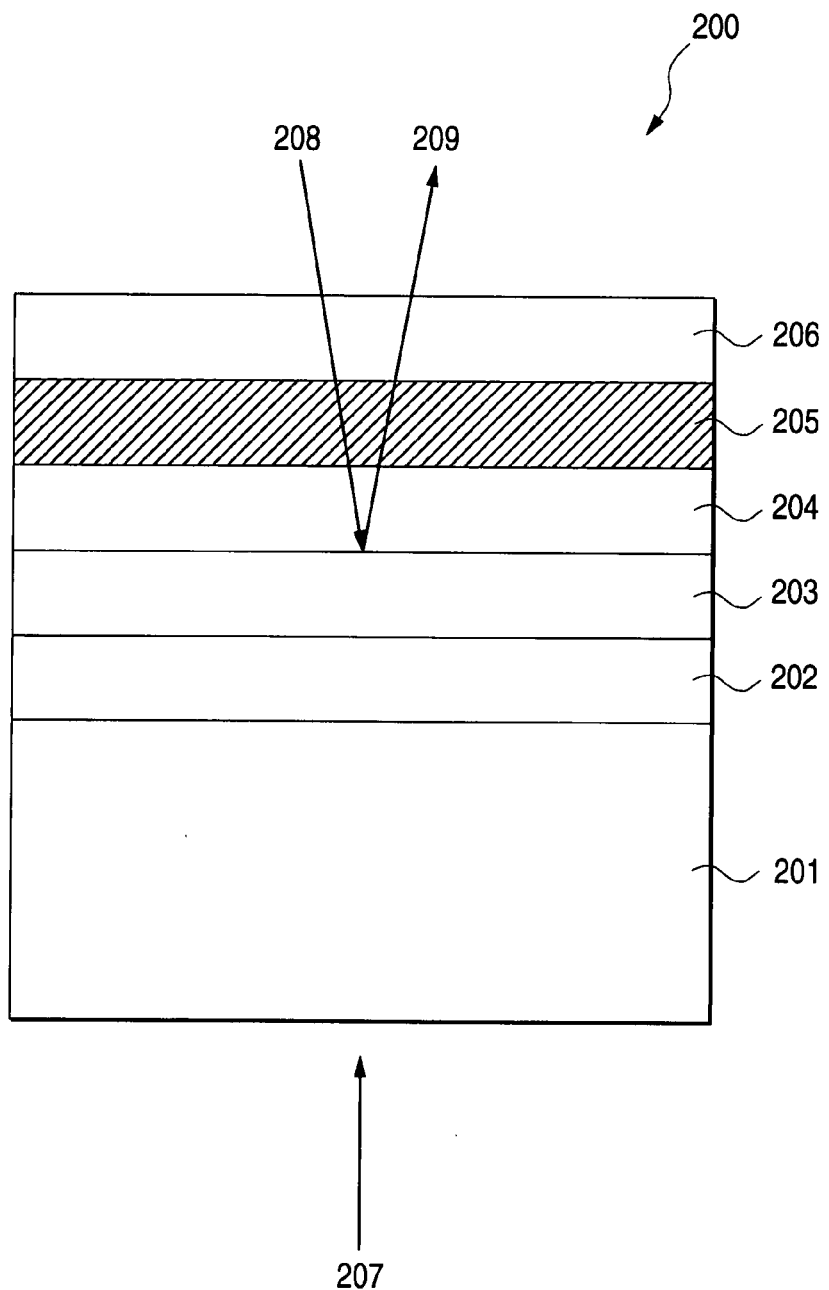
FIG. 2 is a diagram to explain the configuration of a conventional optical information-recording medium.

FIG. 1 is a diagram for the explanation of the configuration of an optical information-recording medium according to the present embodiment. The optical information-recording medium 100 illustrated here includes: a substrate 101; an electronic information-recording layer 102; a reflection layer 103 provided contiguous to the surface of electronic information-recording layer 102 wherein the surface lies opposite to the surface from which a laser beam 107 is incident; a protective layer 104; a visible information-recording layer 105; and an over-coating 106 formed on this visible information-recording layer 105, which are provided on substrate 101 in this order. The substrate 101, the electronic information-recording layer 102, the reflection layer 103 and the protective layer 104 have a radius of r while the visible information-recording layer 105 and the over-coating 106 are formed outside of a circle with a radius of (½)r from the disk center.

As is shown in FIG. 1, electronic information-recording layer 102 provided on optical information-recording medium 100 is subjected to recording and reproduction by means of laser beam 107 incident through substrate 101 from an objective lens (not shown in the figure) of a laser unit for the recording/reproduction of electronic information. On the other hand, visible information-recording layer 105 is subjected to the recording of visible information by, for example, laser beam 108 applied from the label surface side through over-coating 106 when the optical information-recording medium 100 is mounted in the laser unit for the recording/reproduction of electronic information after optical information-recording medium 100 is turned over. Part of laser beam 108 is reflected by reflection layer 103 lying beneath visible information-recording layer 105, and reflected beam 109 is used for focusing to converge laser beam 108.

Substrate 101 is basically made of a material transparent to the recording and reproduction light for electronic information-recording layer 102. Such material for substrate 101 includes, for example, high molecular weight materials such as polycarbonate-based resin, acrylate-based resin, methacrylate-based resin, polystyrene resin, vinyl chloride resin, epoxy resin, polyester resin, and amorphous polyolefin resin, and inorganic materials such as glass and the like. In particular, polycarbonate resin is preferred since it shows a high transmittance to light and a low optical anisotropy, further excelling in mechanical strength. From the viewpoints of chemicals resistance, moisture absorption resistance and optical property, amorphous polyolefin is preferred.

In substrate 101, guiding grooves or pits for recording/reproduction purpose are formed in the surface in contact with electronic information-recording layer 102. These grooves or pits can be formed by various molding processes such as injection molding. It is desirable to fabricate such guiding grooves or pits at the step of molding substrate 101, but alternatively they may be fabricated with use of a UV-curable resin on substrate 101. The lower limit of the thickness of substrate 101 is usually 1.1 mm, and preferably 1.15 mm while the upper limit thereof is usually 1.3 mm and preferably 1.25 mm.

Electronic information-recording layer 102 is made of a material in which electronic information (information recorded in the form of digital signals and read by a certain reproduction unit) is recorded by the application of laser beam 107. Usually, recording layers are made of organic materials or inorganic ones. By way of precaution, electronic information-recording layer 102 may be provided on substrate 101 directly, or via an arbitrary layer provided between substrate 101 and electronic information-recording layer 102 depending on the need in use application.

In the case where electronic information-recording layer 102 is made of an organic material, an organic dye constitutes the main ingredient. Such an organic dye includes, for example, a macro-cyclic aza-anulene-based dye (phthalocyanine, naphthalocyanine and porphyrin), a polymethine dye (cyanine, merocyanine and squalirium), an anthraquinone-based dye, an azulenium-based dye, an azo-based dye, a metal-containing azo-based dye, and a metal-containing indoaniline-based dye. Among these, metal-containing azo-based dyes, cyanine-based dyes and phthalocyanine-based dyes are preferred. In particular, metal-containing azo-based dyes are preferred due to their excellent durability and light-fastness.

As the method of forming electronic information-recording layer 102 made of an organic material, dry process thin film-forming methods such as vacuum vapor deposition and sputtering, and wet process thin film-forming methods that are generally prevailing such as cast coating, spin coating and immersion coating are cited. Of these, spin coating is particularly preferred from the view points of mass productivity and production cost.

When electronic information-recording layer 102 is formed as a recording layer made of an inorganic material, alloys of rare earth, transient metals such as Tb.Te.Co and Dy.Fe.Co, with which recording based on magnet-optical effect is carried out, are used. Further, chalcogenide alloys such as Ge.Te and Ge.Sb.Te which show a phase change can be used, too. Such recording layer may be of a monolayer configuration or consist of two or more layers.

As the method of forming electronic information-recording layer 102 made of an inorganic material, vapor deposition, ion plating and sputtering are cited. Of these, sputtering is particularly preferred from the viewpoints of mass productivity and production cost. With regard to the thickness of electronic information-recording layer 102, the lower limit is usually 5 nm, and preferably 10 nm while the upper limit is usually 500 nm, and preferably 300 nm although the thickness depends on the type of the recording layer. By way of precaution, electronic information-recording layer 102 of optical information recording medium 100 according to the present embodiment of the invention may be of a phase-changing type capable of recording/erasing.

Reflection layer 103 is provided on one side of electronic information-recording layer 102 opposed to substrate 101, and usually has a function of reflecting laser beam 107 applied from the side of substrate 101 back to the side of substrate 101. In the case where guiding grooves or pits for recording/reproduction purpose are formed in substrate 101, a concavo-convex structure corresponding to the grooves or pits is formed in reflection layer 103. As the material used for forming reflection layer 103, those having a sufficiently high reflectivity at the wavelength of the reproduction light are cited, including, for example, metals such as Au, Al, Ag, Cu, Ti, Cr, Ni, Pt, Ta and Pd. These metals may be used individually or as alloys. Of these metals, Au, Al and Ag are appropriate as the material for the reflection layer, since they have high reflectance. Moreover, compositions mainly comprising Ag are particularly preferred since the production cost is low and the reflectance is high.

As the method of forming reflection layer 103, vapor deposition, ion plating and sputtering are cited. Of these, sputtering is particularly preferred from the viewpoints of mass productivity and production cost. The lower limit for the thickness of reflection layer 103 is usually 30 nm, and preferably 50 nm while the upper limit is usually 150 nm, and preferably 120 nm.

Protective layer 104 is usually made of a material that transmits the laser light, exemplified by a UV-curable resin. Specific examples of the UV-curable resin include, for example, acrylate-based resins such as urethane acrylate, epoxy acrylate and polyester acrylate. Most of these materials can be appropriately used since they are transparent to the laser light. These UV-curable resins may be used individually or in combination of two or more thereof. Further, protective layer 104 maybe of monolayer structure or of multilayer one comprising two or more layers.

With regard to the method of forming protective layer 104 by using a UV-curable resin, usually a coating solution is prepared with the UV-curable resin as is or by dissolving the resin in a suitable solvent, the resulting solution is coated on reflection layer 103, and then the coated layer is cured by irradiating a UV light to give rise to a protective layer. As the method of coating, spin coating or cast coating may be adopted. In addition to the above-cited coating methods, various wet process film-forming methods such as screen printing, and dry process film-forming methods such as vacuum deposition, sputtering or ion plating can also be appropriately used for the formation of protective layer 104 depending on the material to be used. Among these methods, a wet process film-forming method, particularly spin coating, is preferred. And, in general, spin coating is employed. The lower limit for the thickness of protective layer 104 is usually 1 µm, and preferably 3 µm while the upper limit is usually 15 µm, and preferably 10 µm.

Invisible information-recording layer 105, the recording material composing the layer undergoes color change by light application, leading to the recording of visible information (visually readable information including letters, signs, images such as illustrations and photographs, and geometric patterns). The recording materials composing visible information-recording layer 105 are not specifically restricted, and the materials which change absorption of the visual light are roughly divided into (a) a type of changing chromogenic property, and (b) a type of changing transparency as will be described below.

As the recording material (a) exhibiting the change of chromogenic property, organic dyes are mentioned which are generally used for the optical recording of electronic information. Such organic dye includes, for example, a macro-cyclic aza-anulene-based dye (phthalocyanine, naphthalocyanine and porphyrin), a polymethine-based dye (cyanine, merocyanine and squalirium), an anthraquinone-based dye, an azulenium-based dye, an azo-based dye, a metal-containing azo-based dye and a metal-containing indoaniline-based dye.

Further, leuco dyes containing a lactone ring portion in the molecular structure are cited. Specific examples of leuco dyes include, for example, fluoran compounds such as 3-diethylamino-7-chloroanilinofluoran, 3-diethylamino-6-methyl-7-anilinofluoran, 3-dibutylamino-6-methyl-7-anilinofluoran, 3-diethylamino-6-methyl-7-2,4-xylidinofluoran, 3-diethylamino-6-methyl-7-(m-toluidino)-fluoran, 3-diethylamino-7,8-benzofuloran, and 3-diethyamino-6-methyl-7-xylidynofluoran; phthalide compounds such as crystal violet lactone, 3-(4-diethylamino-2-ethoxyphenyl)-3-(1-ethyl-2-methylindol-3-yl)-4-azaphthalide, 3-(4-diethylaminophenyl)-3-(1-ethyl-2-methylindol-3-yl)pht halide, and 3,3-bis (1-n-butyl-2-methylindol-3-yl)phthalide. Of these, phthalide compounds are preferred.

For such a leuco dye, an electron-accepting compound or a dye that generates heat upon absorption of the recording laser light is used in combination depending on need. As the electron-accepting compound for this purpose, an organic phosphoric acid compound having an aliphatic group with 6 carbon atoms or more, an aliphatic carboxylic acid compound or a phenol derivative is cited. Of these, a preferable electron-accepting compound is a phenol compound.

Specific examples of the electron-accepting compound include organic phosphoric acid compounds such as dodecylphosphonic acid, tetradecylphosphonic acid, hexadecylphonic acid, octadecylphosphonic acid and eicosylphosphonic acid; and aliphatic carboxylic acid compounds such as α-hydroxydecanoic acid, α-hydroxytetradecanoic acid, α-hydroxyhexadecanoic acid, α-hydroxyoctadecanoic acid, α-hydroxypentadecanoic acid, α-hydroxyeicosanoic acid, α-hydroxydocosanoic acid, α-hydroxytetracosanoic acid, α-hydroxyhexacosanoic acid, and α-hydroxyoctacosanoic acid.

As the phenol compounds, gallic acid compounds, benzoic acid compounds and bisphenol-based compounds are cited. Specific examples of these compounds include, for example, methyl gallate, propyl gallate, butyl gallate and lauryl gallate as the gallic acid compound; methyl p-hydroxybenzoate, ethyl p-hydroxybenzoate, and 2,4-dihydroxybenzoic acid as the benzoic acid compound; and bisphenol S and bisphenol A as the bisphenol-based compound. Moreover, 4'-hydroxy-4-ocatadecylbezanilide, N-octadecyl-4-hydroxybenzamide, N-(4-hydroxyphenyl)-N'-octadecylurea and 4-hydroxyphenylpropionobehenylhydrazide are mentioned.

These electron-accepting compounds may be used individually or in combination of plural kinds.

As the laser light-absorbing dye, the various dyes having been cited as the organic dyes used for optical recording of electronic information, bisanthrone-based or indoaniline-based IR-absorbing dyes are mentioned.

Next, as the recording material (b) exhibiting the change of transparency, an organic low-molecular weight compound which is dispersed in a resinous matrix in the form of 0.1 to 2.0 μm size, and melts or crystallizes upon heat treatment is exemplified. Such compound includes, for example, well known organic low-molecular weight compounds such as higher aliphatic acids with 12 carbon atoms or more. Such organic low-molecular weight compounds may be an aliphatic acid, an aliphatic dibasic acid, a ketone, an ether, an alcohol, an aliphatic acid ester and its derivative. These compounds may be used individually or in combination as mixtures thereof.

Of the organic low-molecular weight compounds that melt or crystallize upon heat treatment, aliphatic acid alkyl esters with 12 carbon atoms or more have preferably low melting points. Thus they are preferable since they melt or crystallize by heat treatment at a relatively low temperature. Further, by using an aliphatic dibasic acid with 10 carbon atoms or more having a high melting point together with an aliphatic acid alkyl ester with 12 carbon atoms or more whereby the mixing ratio of these two compounds, i.e., the aliphatic acid alkyl ester and the aliphatic dibasic acid is appropriately adjusted, the temperature range in which the recording material turns transparent can be controlled, and thus one can modify the degree of transparency as well as the turbidity at a pre-determined temperature.

Examples of the aliphatic acid alkyl ester with 12 carbon atoms or more includes methyl stearate, ethyl stearate, butyl stearate, octyl stearate, stearyl stearate, behenyl stearate, methyl behenate, ethyl behenate, butyl behenate, octyl behenate, stearyl behenate, behenyl behenate, methyl lignoceriate and ethyl lignoceriate.

Examples of the aliphatic dibasic acid with 10 carbon atoms or more include sebacic acid, dodecanonic diacid, tetradecanoic diacid and eicosanoic diacid. In cases where an aliphatic acid alkyl ester with 12 carbon atoms or more is used inconjunction with an aliphatic dibasic acid with 10 carbon atoms or more, a mixing ratio between 1:1 and 10:1 is preferred, and a mixing ratio between 2:1 and 6:1 is more preferred. As the aliphatic dibasic acid having a higher melting point is considered to play the role of regulating the crystallizing behavior as the seed crystal for the aliphatic acid alkyl ester having a lower melting point, there arises the possibility that its effect disappears if the mixed amount is too small, while, in contrast, if the mixed amount is too large, the resulting contrast may sometimes tend to diminish.

As the method of forming visible information-recording layer 105, the publicly known, wet process film-forming methods mentioned in the paragraph describing the method of forming electronic information-recording layer 102 can be adopted. Among those, spin coating or screen printing is preferred, and spin coating is more preferred. The lower limit for the thickness of visible information-recording layer 105 is usually 0.1 μm, and preferably 0.5 μm, while the upper limit thereof is usually 5 μm, and preferably 3 μm.

Over-coating 106, which protects visible information-recording layer 105 from physical damages, and further efficiently condenses laser beam 108 onto visible information-recording layer 105, is provided on the label surface side of visible information-recording layer 105, thus constituting the outermost layer. The material configuring over-coating 106 is not specifically restricted so long as it can protect visible information-recording layer 105 from external forces and the like and is transparent to the laser beam used for recording/reproduction.

As the material configuring over-coating 106, organic materials such as thermoplastic resins, thermo-setting resins, electron beam-curable resins and UV-curable resins are mentioned. By dissolving such a thermoplastic resin, a thermo-setting resin or the like in an appropriate solvent to prepare a coating solution, and coating and drying the coating solution, over-coating 106 can be formed. In the case of a UV-curable resin, a coating solution is prepared just as the resin stands or by dissolving the resin in a suitable solvent. Thereafter by coating the coating solution and curing the coated layer through UV light irradiation, over-coating 106 can be formed. UV-curable resins include, for example, acrylate resins such as urethane acrylate, epoxy acrylate and polyester acrylate. Further, as the inorganic material, $SiO_2$, $SiN_4$, $MgF_2$ and $SnO_2$ are mentioned. These materials may be used individually or in combination of two or more thereof. Over-coating 106 may contain a single layer or two or more multiple layers so long as each layer transmits laser beam 108.

Over-coating 106 is preferably formed by a wet process film-forming method with use of the aforementioned various organic materials. As the film-forming method, spin coating, cast coating or screen printing can be adopted as in the formation of the previously described protective layer 104. Of these, spin coating is particularly preferred since surface smoothness is high. In the case of forming over-coating 106 by a dry process such as adhesive bonding whereby a transparent substrate made of a laser beam-transmitting material and having been prepared in advance is subjected to adhesive bonding, various measures must be adopted during the manufacturing process to realize an accurate registration of the substrate, and further to conduct the bonding procedure under a reduced pressure condition so as not to permit air bubbles to enter into the adhesive layer. Accordingly, from the viewpoint of productivity, it is advantageous to fabricate over-coating 106 by a wet process film-forming method such as spin coating or screen printing.

The lower limit for the thickness of over-coating 106 is usually 10 μm and preferably 20 μm, while the upper limit thereof is usually 100 μm and preferably 80 μm. When the thickness of over-coating 106 is smaller than the lower limit, there arises the risk that the over-coating cannot exhibit a sufficient protective function for visible information-recording layer 105. When the thickness exceeds the upper limit, there arises the need of repeated coating for the formation of over-coating 106 via coating, thus making the film-forming process complicated. Moreover, a large thickness may cause issues such as undesirably large disk deflection due to the curing shrinkage of the coated material. Meanwhile, over-coating 106 is designed so as to have the surface reflectance preferably, for example, not exceeding 20%. In this case, the refractive index of over-coating 106 preferably lies in the range of roughly from 0.4 to 2.6. Further, in order to suppress the surface reflectance of over-coating 106 not to exceed 10%, over-coating 106 preferably has a refractive index between 0.5 and 1.9.

As shown in FIG. 1, optical information-recording medium 100 according to the present embodiment has the shape of disk with a radius of r, and visible information-recording layer 105 and over-coating 106 provided on this visible information-recording layer 105 are formed in the outer peripheral region having a radius of (½)r or more from the disk center. This visible information-recording layer 105 preferably occupies an area not exceeding ¾ of the label surface. Owing to the fact that visible information-recording layer 105 and over-coating 106 provided on this visible information-recording layer 105 are formed in the outer peripheral region having a radius of (½)r or more from the disk center, even an almost 50 μm thick over-coating 106 made of a UV-curable resin does not cause the disk to be deflected too much. Accordingly, manufacture of disks showing stable recording/reproduction characteristics for electronic information is achieved. Namely, development of disk deflection is suppressed by providing the layer that acts as the cause of the development of disk deflection due to the generation of stretching or compressive stress not in the entire region of the label surface but only in the outer periphery thereof. Furthermore, since visible information-recording layer 105 and over-coating 106 are formed circularly, local deflection of the disk (deformation and disk plane fluctuation during rotation) can be prevented.

Still further, owing to the fact that visible information-recording layer 105 and over-coating 106 are formed circularly, information can be printed by means of screen printing in the inner circular region of optical information-recording medium 100 having no visible information-recording layer 105. This means that the medium has a region where the user can record visible information together with another region where the medium maker can record visible information in advance. In addition, since visible information-recording layer 105 lies in the outer periphery having a large area, the amount of information recorded in visible information-recording layer 105 can be increased. Further, in the case where the CAV method is adopted (whereby recording is performed at a constant rotational number both at the inner and outer regions), various advantages are attained including stabilized focusing, since the linear speed is higher for the outer region than for the inner one.

By way of precaution, the optical information-recording medium to which the present embodiment is applied may arbitrarily have still other layers than those described heretofore. For example, in the case where a recording layer made of an inorganic material is used as electronic information-recording layer 102, arbitrary layers may be provided between the individual layers or in contact with the outermost layer of the medium. Such arbitrary layers include dielectric layers which sandwich electronic information-recording layer 102, a second reflection layer inserted between protective layer 104 and visible information-recording layer 105, a laser-transmitting layer inserted between this second reflection layer and visible information-recording layer 105.

EMBODIMENT

Some embodiments are illustrated hereinafter to describe in further detail the optical information-recording medium according to the present embodiment. By way of precaution, the present embodiment is not construed as restricted to Examples at all.

(1) Measurement of Disk Deflection

By using LM-1200, a product of Ono Sokki Co., Ltd., and setting a reference point at the position of 23 mm radius apart from the disk center of the optical information-recording medium (defining the deflection at the reference point as 0), the degrees of deflection were measured at the positions located outside the reference point (up to 58 mm radius with 5 mm steps in the radial direction). The average of deflection (deflection average) for these measured points a long the circular direction were obtained, and the maximum of the deflection averages (in terms of μm) was obtained to represent the degree of disk deflection.

EMBODIMENT 1 AND COMPARATIVE EXAMPLES 1 AND 2

A 1.2 mm thick disk-shaped substrate with 60 mm radius made of a polycarbonate resin having 0.45 μm wide and 155 nm deep grooves were fabricated by injection molding. On this substrate, a fluorinated alcohol solution of a metal-containing azo-based dye was spin coated. The coated layer was dried at 90° C. for 15 min to form a 70 nm thick electronic information-recording layer. Next, on this electronic information-recording layer, Ag was sputtered to provide a 70 nm thick reflection layer. Further, on this reflection layer, a UV-curable resin ("SD-374" manufactured by Dai-Nippon Ink and Chemicals, Inc.) mainly comprising an acrylate-based monomer was spin coated. Thereafter, the layer was cured by UV light irradiation to give a 7 μm thick protective layer. In this way, a CD-R was prepared. In succession, on this protective layer spin coated was a chromogenic organic dye composition consisting of 0.2 parts by weight of a phthalide-based leuco dye, 0.6 parts by weight of an electron-accepting compound (a phenolic compound), 0.05 parts by weight of a bisanthrone-based IR-absorbing dye, 4 parts by weight of poly (methyl methacrylate) (in the form of 10 weight % toluene solution), and 2.0 parts by weight of toluene. The coated layer was dried at 50° C. for 30 min to form a visible information-recording layer. Then, on this visible information-recording layer, a UV-curable resin mainly comprising an acrylate-based monomer was spin coated followed by curing with UV light irradiation to give a 50 μm thick over-coating. In this way, three kinds of optical information-recording media (Optical information-recording media 1 to 3) having different ranges where the visible information-recording layer is formed were prepared.

Of the three optical information-recording media 1 to 3 thus prepared, disk deflection was measured by setting a reference point at the position of 23 mm radius apart from the disk center. The results are shown in Table 1.

TABLE 1

| Optical information-recording medium | Visible information-recording layer | | Disk deflection (μm) |
|---|---|---|---|
| | Formed range (radius in mm) | Shape | |
| Example 1 | Optical information-recording medium 1 | 35 to 55 | Circular | 50 |
| Comparative Example 1 | Optical information-recording medium 2 | 25 to 45 | Circular | 100 |
| Comparative Example 2 | Optical information-recording medium 3 | 25 to 55 | Circular | 150 |

From the results shown in Table 1, it is seen that the deflection of Optical information-recording medium 1 (Embodiment 1) in which the visible information-recording layer and the over-coating are provided in the range of 35 to 55 mm 15 radii from the disk center is 50 μm, which indicates that this optical information-recording medium can perform desirable information recording and reproduction. In contrast, Optical information-recording medium 2 (Comparative Example 1) in which the visible information-recording layer and the over-coating are provided in the range of 25 to 45 mm radii from the disk center, and Optical information-recording medium 3 (Comparative Example 2) in which the visible information-recording layer and the over-coating are provided in the range of 25 to 55 mm radii from the disk center exhibited disk deflections of 100 μm and 150 μm, respectively. Thus, it is seen that some problems can occur for information recording and reproduction with these optical information-recording media.

According to the invention, as has been explained heretofore, an optical information-recording medium can be provided which exhibits a reduced disk deflection, and is capable of recording visible information in the label surface with the irradiation of a low power laser beam.

The present disclosure relates to the subject matter contained in Japanese patent application No. 2003-001793 (filed on Jan. 8, 2003), which is expressly incorporated herein by reference in their entireties.

What is claimed is:

1. An optical information-recording medium comprising:
 a substrate;
 a digital information-recording layer formed on the substrate;
 a visible information-recording layer formed on a top side of the substrate above the digital information-recording layer such that the entire region of the visible information-recording layer lays outside a circumference having a radius not less than half a radius of the substrate, wherein visible information is optically recorded in the visible information-recording layer with light applied from a label surface arranged opposite to a bottom side of the substrate; and
 an over-coating formed on the visible information-recording layer such that the entire region of the over-coating lays outside the circumference having the radius not less than half the radius of the substrate.

2. The optical information-recording medium according to claim 1, wherein the visible information-recording layer is formed in the shape of a circular ring on the top side of the substrate including the label surface.

3. The optical information-recording medium according to claim 1, wherein the visible information-recording layer is formed of a material which changes chromogenic property or transparency by the light applied to the visible information-recording layer.

4. The optical information-recording medium according to claim 1, wherein the visible information-recording layer has an area not exceeding three fourths of the label surface.

5. The optical information-recording medium according to claim 1, wherein a thickness of the over-coating is 10 μm to 100 μm.

6. An optical information-recording medium-comprising:
 a substrate;
 a digital information-recording layer on the substrate in which digital information is recorded by light applied from a bottom side of the substrate;
 a reflection layer on the digital information-recording layer;
 a visible information-recording layer on the reflection layer such that the entire region of the visible information-recording layer lays outside a circumference having a radius not less than half a radius of the substrate; and
 an over-coating on the visible information-recording layer, wherein visible information is optically recorded in the visible information-recording layer with light applied through the over-coating, wherein the entire region of the over-coating lays outside the circumference having the radius not less than half the radius of the substrate.

7. The optical information-recording medium according to claim 6 further comprising a protective layer on the reflection layer and between the reflection layer and the visible information-recording layer.

8. The optical information-recording medium according to claim 6, wherein the substrate, the digital information-recording layer, the reflection layer and the protective layer have substantially a same radius.

9. The optical information-recording medium according to claim 6, wherein a thickness of the over-coating is 10 μm to 100 μm.

10. An optical information-recording medium comprising:
- a substrate;
- a digital information-recording layer on the substrate in which digital information is recorded by light applied from a bottom side of the substrate;
- a reflection layer on the digital information-recording layer;
- a visible information-recording layer on the reflection layer such that the entire region of the visible information-recording layer lays outside a circumference having a radius not less than half a radius of the substrate, wherein visible information is recorded in the visible information-recording layer with light applied from a surface of the optical information-recording medium; and
- an over-coating formed on the visible information-recording layer such that the entire region of the over-coating lays outside the circumference having the radius not less than half the radius of the substrate.

11. An optical information-recording medium comprising:
- a substrate;
- a digital information-recording layer on the substrate in which digital information is recorded by light applied from a bottom side of the substrate;
- a reflection layer on the digital information-recording layer;
- a visible information-recording layer on the reflection layer such that the entire region of the visible information-recording layer lays outside a circumference having a radius not less than half a radius of the substrate, wherein visible information is recorded in the visible information-recording layer with light applied from a surface of the optical information-recording medium; and
- an over-coating formed on the visible information-recording layer such that the entire region of the over-coating lays outside the circumference having the radius not less than half the radius of the substrate.

* * * * *